T. T. ABBOT & J. A. V. SMITH.
FLIERS FOR SPINNING-MACHINES.
No. 7,099. Reissued May 9, 1876.
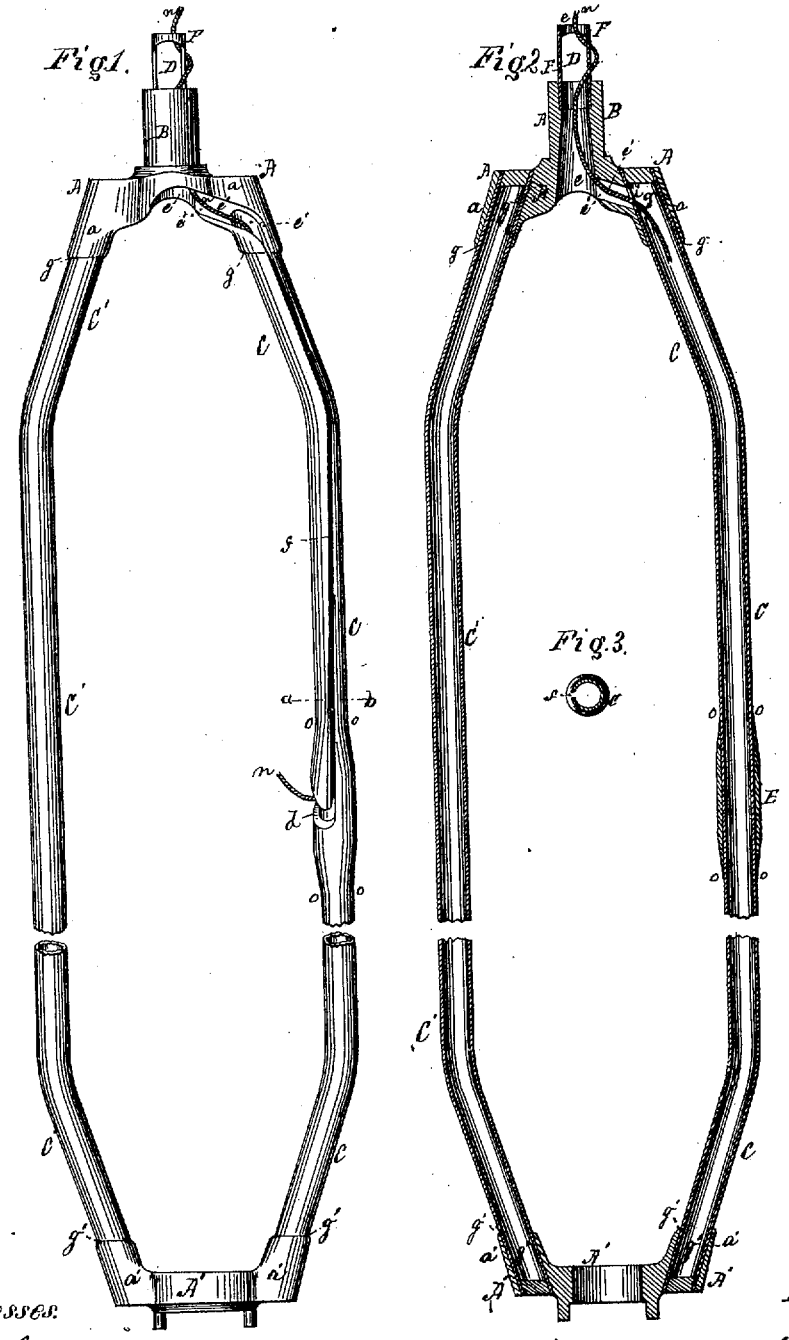
Witnesses:
D. G. Stuart
L. Van Risewick
Inventor:
Theodore T. Abbot & John A. V. Smith
per
P. Hannay
Att.
N. PETERS, PHOTO-LITHOGRAPHER, WASHINGTON, D. C.

UNITED STATES PATENT OFFICE.

THEODORE T. ABBOT, OF LUNENBURG, MASSACHUSETTS, AND JOHN A. V. SMITH, OF MANCHESTER, NEW HAMPSHIRE; SAID ABBOT ASSIGNOR TO SAID SMITH.

IMPROVEMENT IN FLIERS FOR SPINNING-MACHINES.

Specification forming part of Letters Patent No. 110,617, dated January 3, 1871; reissue No. 7,099, dated May 9, 1876; application filed March 29, 1875.

*To all whom it may concern:*

Be it known that we, THEODORE T. ABBOT, formerly of Manchester, in the county of Hillsborough and State of New Hampshire, and now of Lunenburg, in the county of Worcester and State of Massachusetts, and JOHN A. V. SMITH, of Manchester, in the county of Hillsborough, and State New Hampshire, have invented certain new and useful Improvements in Fliers for Spinning-Machines, of which the following is a specification, reference being had to the accompanying drawings, in which—

Figure 1 represents a side elevation of the flier, showing the slit and thread; and Fig. 2, a vertical sectional view of the same. Fig. 3 represents a transverse sectional view of the arm that carries the roving, taken through the line *a b* of Fig. 1.

The object of our invention is to supply a want that has for some time existed by constructing the different parts of the flier so that it shall at once be light, strong, durable, and not liable to break, and yet be of the proper form to admit of the use of the present-shaped bobbins, and at the same time insure to the thread the requisite amount of twist; and it consists in the special construction of the different parts of the flier that is necessary to produce the objects above stated.

These peculiarities of construction consist, first, in constructing the upper and lower shoulder-pieces (commonly called the nose and bottom pieces) with angularly-projecting sockets, so as to receive the ends of the arms of the flier in the general line of their length, instead of at right angles, as heretofore, thereby preventing the tearing apart so common to fliers of the latter form of construction, when rapidly revolved and but imperfectly brazed; secondly, in enlarging the thickness of the metal of the arm which carries the roving or thread at the eye or opening through which the thread issues on its passage to the bobbin, with the view of increasing its capacity of standing tear and wear, and of increasing its strength, to prevent breakage at that point to which it is peculiarly liable, because of wear and centrifugal strain; and, lastly, in the application to the neck of the upper shoulder-piece of an auxiliary mouth-piece or tube provided with two lateral openings, for the purpose of rendering the tension uniform and even. The mouth-piece thus applied can be removed and renewed when worn out at slight expense.

To enable others skilled in the art to make, construct, and use our invention, we will now proceed to describe its parts in detail, omitting a particular description of such parts of a flier as are non-essential to a full understanding of our improvements.

We are aware that fliers have previously been used in which the arms have been secured to an upper and lower shoulder-piece; but these shoulder-pieces, unlike ours, were provided with sockets for the reception of the ends of the arms, so arranged as to receive them at right angles to the line of their length, the ends of the arms being abruptly bent around in a curved line for this purpose. Such construction, where the brazing of the arms to the shoulder-pieces is defective, results in a disruption of the parts, the arms frequently tearing out of their sockets.

Our improvement consists in constructing these shoulder-pieces A A′ with angularly-projecting sockets *g g′*, they being at their projecting ends made to diverge, as shown in Fig. 2. Into these sockets are fitted and brazed or soldered the arms C C′ of the flier. The upper shoulder-piece A represents the so-called nose-piece of the flier, and the lower shoulder-piece A′ the bottom piece. The nose-piece A consists of a short tube, B, cast or provided with the two arms *a*, in which the sockets *g g* are formed. In one of these arms *a* is formed a slit, *e′*, which communicates at one end with the throat *e* of the tube B, and at the other with an aperture, *i*, cut in the side of the thread-carrying tubular arm C at or near its upper end. This slit is also continued to the lower end of arm *a*, as shown in Fig. 1. The nose-piece A is formed of metal, preferably of cast-steel. In the upper end of its tube B we insert a tension-regulator for the roving, consisting of a short tube, F, provided with two slots or openings, D, arranged on opposite sides. Through these openings the roving is laced to regulate its tension. Tube B, when worn, may be removed and replaced by another. The lower shoulder or bottom piece A′ is also formed with angularly-projecting arms *a′ a′*, each of which is provided with a socket, *g′*, similar to those in nose-piece A. Into these sockets *g′* the lower ends of arms C C′ fit, and are brazed or soldered; but in neither of the arms *a′* of this bottom piece is a slit cut or otherwise formed in the manner of slit *e′* of nose-piece A.

The arms C C′ are bent inwardly at each end, as shown in Figs. 1 and 2, so as to converge toward each other at their upper and lower ends, in accordance with the angle of sockets *g g′*. Arm C′ consists of a simple unbroken tube throughout its length. The other or thread-carrying arm C is also tubular, and should of necessity be so down as far as its eye or opening *d*. The ends of each of these arms are preferably closed or plugged for obvious reasons. Arm C is provided with the usual slit *f*, which communicates at top with slit *e′* in nose-piece A, and with opening *i* in its side, and at its lower end with the eye or exit-opening *d*, for the passage of the thread *n* from the arm to the bobbin. Now, as the action of the thread in its passage through opening *d* to the bobbin, in course of time, because of the thinness of the material, speedily wears the opening much larger, and as this enlargement of the opening weakens the arm at that point to such an extent as to frequently result in its breaking at that place, we, with the view of decreasing this wear, and of re-enforcing the strength of the arm at that point, here increase the thickness of arm C. This is readily effected by brazing an extra piece of steel of unclosed tubing E to the outside of arm C. Piece E, for this purpose, is made long enough to extend for a short distance both above and below opening *d*, as shown at *o o* in Figs. 1 and 2. The upper end of piece E is provided with a slit, corresponding in size and shape with the lower end of slit *f* in arm C, and coincides therewith. In practice we use for this purpose a plate of steel of the required length, breadth, and thickness, and bend it into tubular form, leaving a space of the width required between its lips throughout its entire length, so that when applied to arm C its two lips shall coincide with the lips of slit *f* of arm C. This re-enforcement of the metal of arm C at *d* increases the durability of the arm, and at the same time gives the necessary increase of strength to the arm at that point to prevent breakage.

The angularly-arranged sockets *g g′* of shoulder-pieces A A′ not only prevent the arms from tearing out, even if imperfectly brazed or soldered, but enable the flier to receive arms of suitable shape to admit of the use of bobbins of the present improved construction.

The auxiliary tube F, with its slots D, enables the necessary twist to be given to the thread, and at the same time renders the draw on the roving uniform and even. The roving, for this purpose, is passed into the throat *e* at top of tube F, thence through one and back again through the other opening D, and thence down through throat *e* to slit *e′*, and then along the latter and into the tubular arm C through opening *i*, and down through slit *f*, and out at opening *d*, and thence, in the usual way, to the bobbin.

Having thus described our invention, what we claim as new, and desire to secure by Letters Patent, is—

1. A nose-piece, A, of a flier, provided with two angularly-projecting arms *a* and sockets *g*, one of said arms and sockets being provided with a slit, *e′*, arranged as described, whereby it communicates at one end with the throat *e* of the nose-piece, and at the other with the slit *f* and opening *i* in the arm C, that carries the thread, substantially as and for the purpose set forth.

2. The combination of the shoulder-pieces A A′, each provided with angularly-projecting arms and sockets, with the two flier-arms, for the purpose set forth.

3. The combination, in a flier of the form herein shown and described, of the tubular metal plate E with the thread-carrying arm C, as and for the purpose set forth.

4. In combination with the nose-piece A, provided with the throat *e*, the auxiliary tube F provided with openings D, arranged therein in the manner substantially as and for the purpose set forth.

In testimony whereof we hereunto subscribe this specification.

THEODORE T. ABBOT.
JOHN A. V. SMITH.

Witnesses to signature of ABBOT:
CYRUS KILBURN,
MEHITABLE F. ABBOT.

Witnesses to signature of SMITH:
E. DUSTIN,
W. E. LAMPER.